(12) United States Patent
Park et al.

(10) Patent No.: US 9,243,820 B2
(45) Date of Patent: Jan. 26, 2016

(54) APPARATUS AND METHOD FOR MEASURING CONCENTRATION OF LIQUID-STATE REFRIGERANT OF NONAZEOTROPE REFRIGERANT MIXTURE, AND ABSORPTION TYPE, 1-STAGE COMPRESSING-ABSORBING TYPE AND 2-STAGE COMPRESSING-ABSORBING TYPE HEAT PUMP INCLUDING THE APPARATUS

(71) Applicant: KOREA INSTITUTE OF ENERGY RESEARCH, Daejeon (KR)

(72) Inventors: Seong-Ryong Park, Daejeon (KR); Siyoung Jeong, Seoul (KR); Minsung Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 491 days.

(21) Appl. No.: 13/658,105

(22) Filed: Oct. 23, 2012

(65) Prior Publication Data

US 2013/0167568 A1    Jul. 4, 2013

(30) Foreign Application Priority Data

Jan. 2, 2012  (KR) .................. 10-2012-0000051

(51) Int. Cl.
*F25B 15/00* (2006.01)
*F25B 25/02* (2006.01)
(Continued)

(52) U.S. Cl.
CPC ............ *F25B 15/00* (2013.01); *F25B 25/02* (2013.01); *F25B 49/005* (2013.01); *F25B 49/04* (2013.01); *F25B 9/006* (2013.01); *Y02B 30/62* (2013.01)

(58) Field of Classification Search
CPC ........ F25B 15/00; F25B 49/005; F25B 25/02; F25B 49/04; F25B 9/006
USPC .................... 62/127, 129, 114, 174
See application file for complete search history.

(56) References Cited

U.S. PATENT DOCUMENTS

| 4,722,196 | A | * | 2/1988 | Ishikawa | ............... F25B 49/025 62/193 |
| 4,724,679 | A | * | 2/1988 | Radermacher | .......... F25B 25/02 62/101 |

(Continued)

FOREIGN PATENT DOCUMENTS

| CA | WO 2009109036 A1 * | 9/2009 | ............. F25B 15/04 |
| JP | 11-083229 A | 3/1999 | |

(Continued)

*Primary Examiner* — Allana Lewin Bidder
*Assistant Examiner* — Kun Kai Ma
(74) *Attorney, Agent, or Firm* — Paratus Law Group, PLLC (57) ABSTRACT

An apparatus and method for measuring concentration of a liquid-state refrigerant of a nonazeotrope refrigerant mixture. A container is disposed in such a way that a liquid-state refrigerant mixture of the nonazeotrope refrigerant mixture in a saturated state is temporarily stored with set quality. By measuring temperature and pressure of the liquid-state refrigerant mixture, concentration of the liquid-state refrigerant can be calculated from a database regarding a relationship between a saturation vapor pressure, temperature, quality, and concentration of the previously-stored nonazeotrope refrigerant mixture in the saturated state. Thus, a configuration for measuring the concentration of the liquid-state refrigerant-absorbent mixture includes a container, a temperature sensor and a pressure sensor and thus is very simple and the cost for the configuration can be reduced. In addition, the container can be easily mounted on existing equipment without disturbance of a flow.

19 Claims, 5 Drawing Sheets (51) Int. Cl.
*F25B 49/00* (2006.01)
*F25B 49/04* (2006.01)
*F25B 9/00* (2006.01)

(56) References Cited

U.S. PATENT DOCUMENTS

| | | | | |
|---|---|---|---|---|
| 4,769,999 | A | * | 9/1988 | Fujiwara ................ F25B 9/006 62/114 |
| 4,842,741 | A | * | 6/1989 | Coughlin ........... B01D 67/0027 210/490 |
| 5,096,747 | A | * | 3/1992 | Scholla ................ C11D 3/0031 427/299 |
| 5,158,747 | A | * | 10/1992 | Manz et al. ...................... 422/98 |
| 5,168,721 | A | * | 12/1992 | Hancock ................ F25B 45/00 62/292 |
| 5,186,012 | A | * | 2/1993 | Czachorski et al. ............ 62/114 |
| 5,205,137 | A | * | 4/1993 | Ohuchi ................ F25B 15/008 62/324.2 |
| 5,255,527 | A | * | 10/1993 | Paige ................................. 62/85 |
| 5,295,360 | A | * | 3/1994 | Olds et al. ...................... 62/127 |
| 5,371,019 | A | * | 12/1994 | Manz et al. ................... 436/126 |
| 5,514,595 | A | * | 5/1996 | Olds et al. ..................... 436/126 |
| 5,588,596 | A | * | 12/1996 | Hartfield et al. .............. 239/542 |
| 5,802,859 | A | * | 9/1998 | Zugibe ............................ 62/125 |
| 5,896,747 | A | * | 4/1999 | Antohi ................. B60H 1/3201 62/101 |
| 5,934,090 | A | * | 8/1999 | Ozu ........................ F25B 15/06 62/105 |
| 7,886,172 | B2 | * | 2/2011 | Bose ...................... G06F 1/206 713/300 |
| 2005/0193758 | A1 | * | 9/2005 | Wells ...................... F25B 15/02 62/324.2 |
| 2006/0087539 | A1 | * | 4/2006 | Loyd et al. ....................... 347/89 |
| 2006/0246594 | A1 | * | 11/2006 | Appel et al. .................... 436/81 |
| 2007/0234745 | A1 | * | 10/2007 | Suzawa ................... H02G 15/34 62/127 |
| 2010/0218516 | A1 | * | 9/2010 | Nemer ................... C21D 9/573 62/64 |
| 2010/0242501 | A1 | * | 9/2010 | Li ............................. F25D 3/10 62/51.1 |

FOREIGN PATENT DOCUMENTS

| | | |
|---|---|---|
| JP | 2000193341 A * | 7/2000 |
| JP | 2002-005538 A | 1/2002 |
| JP | 2004156815 A * | 6/2004 |
| JP | 2005147447 A * | 6/2005 |
| KR | 20-0376219 | 3/2005 |
| KR | 10-0630316 B1 | 10/2006 |

\* cited by examiner

APPARATUS AND METHOD FOR MEASURING CONCENTRATION OF LIQUID-STATE REFRIGERANT OF NONAZEOTROPE REFRIGERANT MIXTURE, AND ABSORPTION TYPE, 1-STAGE COMPRESSING-ABSORBING TYPE AND 2-STAGE COMPRESSING-ABSORBING TYPE HEAT PUMP INCLUDING THE APPARATUS

CROSS-REFERENCE TO RELATED PATENT APPLICATION

This application claims the benefit of Korean Patent Application No. 10-2012-0000051, filed on Jan. 2, 2012, in the Korean Intellectual Property Office, the disclosure of which is incorporated herein in its entirety by reference.

BACKGROUND OF THE INVENTION

1. Field of the Invention

The present invention relates to an apparatus and method for measuring concentration of a liquid-state refrigerant of a nonazeotrope refrigerant mixture and a heat pump including the apparatus, and more particularly, to an apparatus and method for measuring concentration of a liquid-state refrigerant of a nonazeotrope refrigerant mixture, whereby the concentration of the liquid-state refrigerant may be measured using a saturation pressure and temperature of the liquid-state refrigerant and an absorption type heat pump including the apparatus.

2. Description of the Related Art

In absorption type heat pump systems using ammonia, or the like as a refrigerant, the concentration of an ammonia aqueous solution varies according to a current flow. Thus, information regarding the concentration of an aqueous solution is essential in order to evaluate and control the capability of an absorption type heat pump system. In general, a small amount of ammonia aqueous solution can be extracted from the absorption type heat pump system, and the concentration of the ammonic aqueous solution can be measured using titration or density measurement that is an extraction method. However, when such an extraction method is used, it may be difficult to measure the concentration of the ammonia aqueous solution in real-time, or a handling process may be inconvenient and dangerous. In addition, a very small amount of ammonia aqueous solution can be evaporated or may leak during an extraction process. Thus, a measurement error may be generated, and it is difficult to maintain the same conditions after the extraction process has been performed.

In order to solve the problems relating to the extraction method, a method of predicting the concentration of an aqueous solution by using an apparatus for measuring conductance is disclosed in 'Romero R. j., Herna' ndez J., Ramirez O., and Aguillon J., 1999, Thermodynamic Data in a Falling Film Absorber Operation on Ammonia/Water Solutions, Proc. of the Int. Sorption Heat Pump Conf., pp. 283-289. However, the reliability of concentration predicted by a method of measuring conductance has not been verified yet.

SUMMARY OF THE INVENTION

The present invention provides an apparatus and method for measuring concentration of a liquid-state refrigerant of a nonazeotrope refrigerant mixture in which refrigerants having different evaporation pressures are mixed, whereby the concentration of the liquid-state refrigerant of the nonazeotrope refrigerant mixture may be measured using a saturation pressure and temperature of the liquid-state refrigerant.

According to an aspect of the present invention, there is provided an apparatus for measuring concentration of a liquid-state refrigerant of a nonazeotrope refrigerant mixture, the apparatus including: a container in which, when a nonazeotrope refrigerant mixture in which two kinds of refrigerants having different evaporation pressures are mixed, is in a saturated state, a liquid-state refrigerant mixture of the nonazeotrope refrigerant mixture flows into one side of the container and is filled in an internal storage space of the container and the filled liquid-stated refrigerant mixture is discharged to the other side of the container; a temperature sensor that measures a temperature of the liquid-state refrigerant mixture; a pressure sensor that measures a pressure of the liquid-state refrigerant mixture in the saturated state or a pressure of the container; and a controller including a memory unit in which a database regarding a relationship between a saturation vapor pressure, temperature, quality, and concentration of the nonazeotrope refrigerant mixture in the saturated state is stored, and an arithmetic operation unit that calculates concentration of the liquid-state refrigerant mixture from the database based on the temperature and the pressure measured by the temperature sensor and the pressure sensor, assuming that the quality of the liquid-state refrigerant mixture is set quality.

According to another aspect of the present invention, there is provided an apparatus for measuring concentration of a liquid-state refrigerant of a nonazeotrope refrigerant mixture, the apparatus including: a container in which, when a nonazeotrope refrigerant mixture in which two kinds of refrigerants having different evaporation pressures are mixed, is in a subcooled state, a liquid-state refrigerant mixture of the nonazeotrope refrigerant mixture flows into one side of the container and is filled in an internal storage space of the container and the filled liquid-stated refrigerant mixture is discharged to the other side of the container; a heater that heats the subcooled liquid-state refrigerant mixture to be in a saturated state; a temperature sensor that measures a temperature of the heated liquid-state refrigerant mixture; a pressure sensor that measures a pressure of the liquid-state refrigerant mixture in the subcooled state or a pressure of the container; and a controller including a memory unit in which a database regarding a relationship between a saturation vapor pressure, temperature, quality, and concentration of the liquid-state refrigerant mixture in the saturated state is stored, and an arithmetic operation unit that calculates concentration of the liquid-state refrigerant mixture from the database based on the temperature and the pressure measured by the temperature sensor and the pressure sensor, assuming that the quality of the liquid-state refrigerant mixture is set quality.

According to another aspect of the present invention, there is provided a method of measuring concentration of a liquid-state refrigerant of a nonazeotrope refrigerant mixture, the method including: when a nonazeotrope refrigerant mixture in which two kinds of refrigerants having different evaporation pressures are mixed, is in a saturated state, allowing a liquid-state refrigerant mixture of the nonazeotrope refrigerant mixture to flow into one side of the container and to be filled in an internal storage space of the container and the filled liquid-stated refrigerant mixture to be discharged to the other side of the container; measuring a temperature of the liquid-state refrigerant mixture and a pressure of the liquid-state refrigerant mixture in the saturated state; if the quality of the liquid-state refrigerant mixture is set quality, calculating concentration of the liquid-state refrigerant mixture from a database regarding a relationship between a saturation vapor pressure, temperature, quality, and concentration of the nonazeotrope refrigerant mixture in the saturated state based on the temperature and the pressure measured by the temperature sensor and the pressure sensor.

According to another aspect of the present invention, there is provided a method of measuring concentration of a liquid-state refrigerant of a nonazeotrope refrigerant mixture, the method including: when a nonazeotrope refrigerant mixture in which two kinds of refrigerants having different evaporation pressures are mixed, is in a subcooled state, allowing a liquid-state refrigerant mixture of the nonazeotrope refrigerant mixture to flow into one side of the container and to be filled in an internal storage space of the container and the filled liquid-stated refrigerant mixture to be discharged to the other side of the container; heating the subcooled liquid-state refrigerant mixture to be in a saturated state; measuring a temperature of the heated liquid-state refrigerant mixture and a pressure of the liquid-state refrigerant mixture in the subcooled state; and if the quality of the liquid-state refrigerant mixture is set quality, calculating concentration of the liquid-state refrigerant mixture from a database regarding a relationship between a saturation vapor pressure, temperature, quality, and concentration of the liquid-state refrigerant mixture in the saturated state based on the temperature and the pressure measured by the temperature sensor and the pressure sensor.

According to another aspect of the present invention, there is provided an absorption type heat pump including an apparatus for measuring concentration of a liquid-state refrigerant of a nonazeotrope refrigerant mixture, wherein the apparatus for measuring concentration of a liquid-state refrigerant of a nonazeotrope refrigerant mixture includes: an absorber into which a vapor refrigerant evaporated by an evaporator flows and which enables the vapor refrigerant to be absorbed in a refrigerant-absorbent mixture; a regenerating device that evaporates a part of a refrigerant from the refrigerant-absorbent mixture ejected from the absorber; a condenser that condenses the evaporated refrigerant ejected from the regenerating device and transfers the condensed refrigerant to the evaporator; a container which is connected to a liquid-state ejection passage of one of the absorber and the regenerating device and into which the ejected liquid-state refrigerant-absorbent mixture flows and then is discharged; a temperature sensor that is disposed on the container and measures a temperature of the liquid-state refrigerant-absorbent mixture; a pressure sensor that is disposed on one among the absorber, the regenerating device, and the container and measures a pressure of the liquid-state refrigerant mixture in the saturated state or a pressure of the container; and a controller including a memory unit in which a database regarding a relationship between a saturation vapor pressure, temperature, quality, and concentration of the liquid-state refrigerant mixture in the saturated state is stored, and an arithmetic operation unit that calculates concentration of the liquid-state refrigerant mixture from the database based on the temperature and the pressure measured by the temperature sensor and the pressure sensor, assuming that the quality of the liquid-state refrigerant mixture is set quality.

According to another aspect of the present invention, there is provided a 1-stage compressing-absorbing type heat pump including an apparatus for measuring concentration of a liquid-state refrigerant of a nonazeotrope refrigerant mixture, wherein the apparatus for measuring concentration of a liquid-state refrigerant of a nonazeotrope refrigerant mixture includes: a compressor; an absorber which absorbs a high-temperature and high-pressure refrigerant ejected from the compressor in a refrigerant-absorbent mixture; a regenerating device that evaporates a part of a refrigerant from the refrigerant-absorbent mixture ejected from the absorber and transfers the evaporated refrigerant to the compressor; a container which is connected to a liquid-state ejection passage of one of the absorber and the regenerating device and into which the ejected liquid-state refrigerant-absorbent mixture flows and then is discharged; a temperature sensor that is disposed on the container and measures a temperature of the liquid-state refrigerant-absorbent mixture; a pressure sensor that is disposed on one among the absorber, the regenerating device, and the container and measures a pressure of the container or a pressure of the absorber or the regenerating device into which the liquid-state refrigerant mixture flows; and a controller including a memory unit in which a database regarding a relationship between a saturation vapor pressure, temperature, quality, and concentration of the liquid-state refrigerant mixture in the saturated state is stored, and an arithmetic operation unit that calculates concentration of the liquid-state refrigerant mixture from the database based on the temperature and the pressure measured by the temperature sensor and the pressure sensor, assuming that the quality of the liquid-state refrigerant mixture is set quality.

According to another aspect of the present invention, there is provided a 2-stage compressing-absorbing type heat pump including an apparatus for measuring concentration of a liquid-state refrigerant of a nonazeotrope refrigerant mixture, wherein the apparatus for measuring concentration of a liquid-state refrigerant of a nonazeotrope refrigerant mixture includes: a low-pressure compressor that compresses an evaporated refrigerant; a high-pressure compressor that compresses a refrigerant ejected from the low-pressure compressor; an absorber which enables a high-temperature and high-pressure refrigerant ejected from the high-pressure compressor to be absorbed in a refrigerant-absorbent mixture; a regenerating device that evaporates a part of a refrigerant from the refrigerant-absorbent mixture ejected from the absorber and transfers the evaporated refrigerant to the low-pressure compressor; a container which is connected to a liquid-state ejection passage of one of the absorber and the regenerating device and into which the ejected liquid-state refrigerant-absorbent mixture flows and then is discharged; a temperature sensor that is disposed on the container and measures a temperature of the liquid-state refrigerant-absorbent mixture; a pressure sensor that is disposed on one among the absorber, the regenerating device, and the container and measures a pressure of the container or a pressure of the absorber or the regenerating device into which the liquid-state refrigerant mixture flows; and a controller including a memory unit in which a database regarding a relationship between a saturation vapor pressure, temperature, quality, and concentration of the liquid-state refrigerant mixture in the saturated state is stored, and an arithmetic operation unit that calculates concentration of the liquid-state refrigerant mixture from the database based on the temperature and the pressure measured by the temperature sensor and the pressure sensor, assuming that the quality of the liquid-state refrigerant mixture is set quality.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
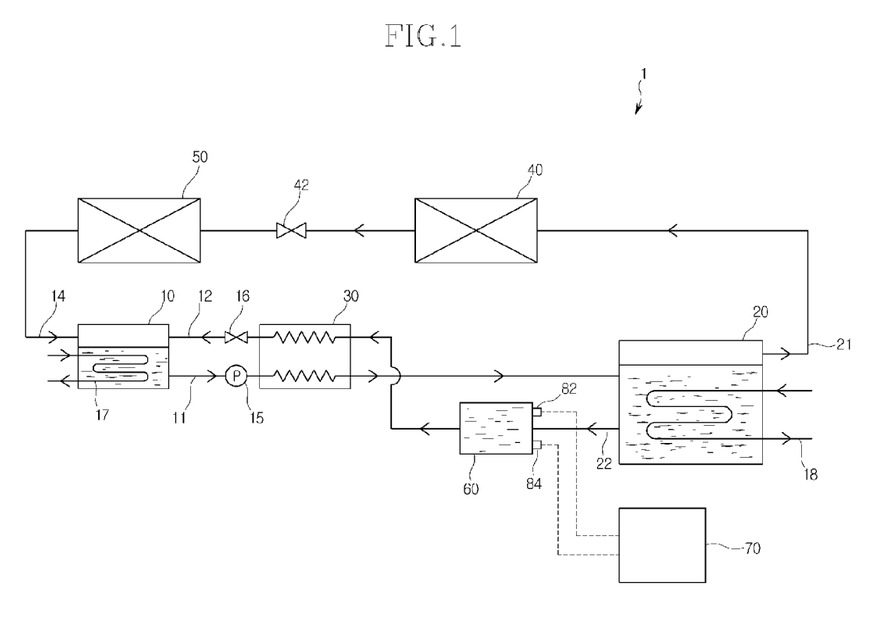
FIG. 1 is a view of a structure of an absorption type heat pump including an apparatus for measuring concentration of a liquid-state refrigerant of a nonazeotrope refrigerant mixture, according to an embodiment of the present invention.
Figure 2:
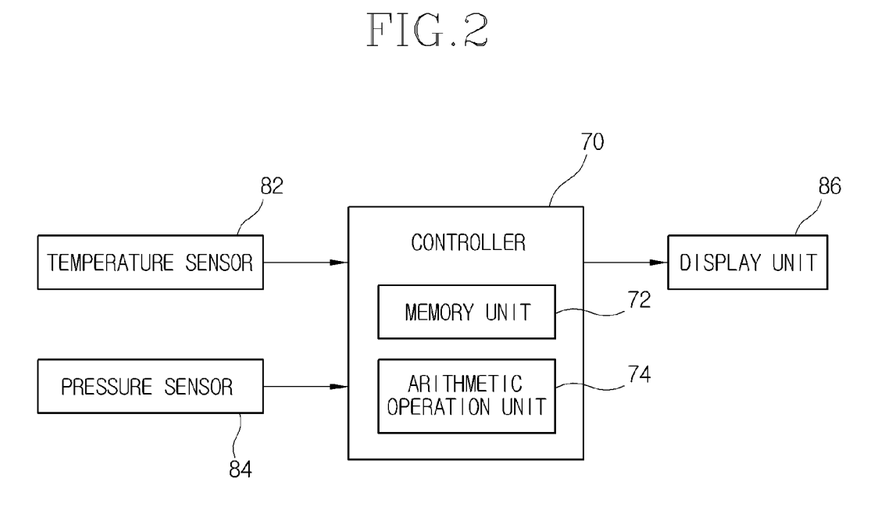
FIG. 2 is a block diagram of a control configuration of the absorption type heat pump illustrated in FIG. 1.

FIG. 1 is a view of a structure of an absorption type heat pump 1 including an apparatus for measuring concentration of a liquid-state refrigerant of a nonazeotrope refrigerant mixture, according to an embodiment of the present invention, and FIG. 2 is a block diagram of a control configuration of the absorption type heat pump 1 illustrated in FIG. 1.

Referring to FIG. 1, the absorption type heat pump 1 according to the current embodiment of the present invention includes an absorber 10, a regenerating device 20, an intermediate heat exchanger 30, a condenser 40, an evaporator 50, a container 60, and a controller 70.

A vapor refrigerant evaporated by the evaporator 50 flows into the absorber 10 and is absorbed in a refrigerant-absorbent mixture by using the absorber 10. The refrigerant-absorbent mixture is a nonazeotrope refrigerant mixture in which two kinds of refrigerants having different evaporation pressures are mixed. The refrigerant-absorbent mixture may have various combinations and may be a water-LiBr combination, an ammonia-water combination, a R22-DEGDME combination, a R22-DMETEG(E181) combination, a carbon dioxide-acetone combination, a TFE-DMETEG(E181) combination, and the like. The absorber 10 may generate an absorption heat in an absorption process, and the absorption heat may be cooled using cooling water. The cooling water that is cooled by the absorber 10 may be used as hot water in a place where the hot water is required. The absorber 10 may include a cooler 17 that absorbs the absorption heat when the cooling water flows into the absorber 10 and then is ejected from the absorber 10. An absorber liquid-state ejection passage 11 through which the liquid-state refrigerant-absorbent mixture is ejected, is connected to the absorber 10, and a first absorber inflow passage 12 through which a refrigerant-absorbent mixture is ejected from the intermediate heat exchanger 30, and a second absorber inflow passage 14 through which a vapor refrigerant-absorbent mixture is ejected from the evaporator 50 are connected to the absorber 10. A pump 15 for pumping the liquid-state refrigerant-absorbent mixture is disposed on the absorber liquid-state ejection passage 11, and a throttle valve 16 for expanding the refrigerant-absorbent mixture ejected from the intermediate heat exchanger 30 is disposed on the first absorber inflow passage 12.

The regenerating device 20 evaporates a part of a refrigerant from the refrigerant-absorbent mixture that is ejected from the absorber 10. A heating source 18 is installed at the regenerating device 20, and a refrigerant having a relatively high evaporation pressure of the refrigerant and the absorbent is mainly evaporated due to heating of the heating source 18. The vapor refrigerant that is evaporated by the regenerating device 20, flows into the condenser 40 via a regenerating device vapor ejection passage 21, and the liquid-state refrigerant-absorbent mixture in the regenerating device 20 flows into the intermediate heat exchanger 30 via the regenerating device liquid state ejection passage 22.

The intermediate heat exchanger 30 is disposed between the absorber 10 and the regenerating device 20 and heat-exchanges the refrigerant-absorbent mixture ejected from the absorber 10 with the refrigerant-absorbent mixture ejected from the regenerating device 20. In the intermediate heat exchanger 30, a high-pressure refrigerant-absorbent mixture ejected from the absorber 10 may be preheated by using a high-pressure refrigerant-absorbent mixture ejected from the regenerating device 20 and may be transferred to the regenerating device 20.

The condenser 40 condenses the vapor refrigerant ejected from the regenerating device 20 and then transfers the condensed vapor refrigerant to the evaporator 50. The condenser 40 may be condensed using cooling water. An expansion valve may be disposed on an ejection passage of the condenser 40 and may expand the condensed refrigerant.

The evaporator 50 evaporates the vapor refrigerant condensed by the condenser 40 and then discharges the evaporated vapor refrigerant to the absorber 10.

The container 60 is disposed on the regenerating device liquid-state ejection passage 22. The container 60 is configured in such a way that the liquid-state refrigerant-absorbent mixture ejected from the regenerating device 20 flows into the container 60, is filled in an internal storage space of the container 60 and is re-ejected from the container 60. However, aspects of the present invention are not limited thereto, and the container 60 may be disposed on the liquid-state ejection passage 11 of the absorber 10 and may be configured in such a way that the liquid-state refrigerant-absorbent mixture flows into the container 60, is filled in the internal storage space of the container 60 and is re-ejected from the container 60. The inside of the container 60 may be filled with the liquid-state refrigerant-absorbent mixture, and it may be assumed that quality of the inside of the container 60 is 0.

In addition, a temperature sensor 82 is disposed on the container 60 and measures the temperature of the liquid-state refrigerant-absorbent mixture. Since the liquid-state refrigerant-absorbent mixture continuously flows into one side of the container 60 and is continuously ejected from the other side of the container, the temperature sensor 82 measures the temperature of the liquid-state refrigerant-absorbent mixture in real-time.

A pressure sensor 84 is disposed on one of the regenerating device 20 and the container 60 and measures the pressure of the liquid-state refrigerant-absorbent mixture. Since the pressure of the liquid-state refrigerant-absorbent mixture in each of the regenerating device 20 and the container 60 is nearly constant, the pressure of the liquid-state refrigerant-absorbent mixture in any one of the regenerating device 20 and the container 60 may be measured. However, when the container 60 is disposed on the liquid-state ejection passage 11 of the absorber 10, the pressure sensor 84 may be disposed on one of the absorber 10 and the container 60.

Referring to FIG. 2, the controller 70 includes a memory unit 72 in which a database regarding the relationship between a saturation vapor pressure, temperature, quality, and concentration of the liquid-state refrigerant-absorbent mixture in a saturated state is stored, and an arithmetic operation unit 74 in which, assuming that the quality of the refrigerant-absorbent mixture is set quality, the concentration of the liquid-state refrigerant-absorbent mixture is calculated from the database based on the temperature and pressure measured by the temperature sensor 82 and the pressure sensor 84. The controller 70 may be a microcomputer, or the like.

A database regarding the relationship between a saturation vapor pressure, temperature, quality, and concentration of the nonazeotrope refrigerant mixture in a saturated state is stored in the memory unit 72.

The saturation vapor pressure Psat of the nonazeotrope refrigerant may be represented as a function of temperature T, concentration $\xi$, and the quality q. The function of the saturation vapor pressure Psat may be expressed as follows.

$$Psat=f(T,\xi,q)$$

When the liquid-state refrigerant-absorbent mixture of the nonazeotrope refrigerant mixture is fully filled in the container 60, the mass of gas in the container 60 is an ignorable small value and thus, the quality q may be assumed as 0.

Assuming that the quality q is 0, the saturation vapor pressure Psat of the nonazeotrope refrigerant mixture may be expressed as a function of temperature T and concentration $\xi$.

$$Psat=f(T,\xi,0)$$

Since the function may be obtained by experiments, or the like, the concentration $\xi$ of the nonazeotrope refrigerant mixture may be obtained from the saturation vapor pressure Psat and temperature T of the nonazeotrope refrigerant mixture.

Thus, a database regarding the concentration $\xi$ of the nonazeotrope refrigerant mixture based on the saturation vapor pressure Psat and the temperature T of the nonazeotrope refrigerant mixture that are obtained by experiments, may be stored in the memory unit 72.

When the temperature and the pressure of the liquid-state refrigerant-absorbent mixture are measured by the temperature sensor 82 and the pressure sensor 84, the arithmetic operation unit 74 may obtain the concentration of the liquid-state refrigerant-absorbent mixture by substituting the measured temperature and pressure for the database stored in the memory unit.

In addition, the absorption type heat pump 1 may further include a display unit 86 that displays concentration obtained with being connected to the arithmetic operation unit 74 in online.

An operation of measuring the concentration of the liquid-state refrigerant-absorbent mixture by using the absorption type heat pump having the above structure illustrated in FIG. 1 will now be described.

When the liquid-state refrigerant-absorbent mixture ejected from the regenerating device 20 is fully filled in the container 60, it may be assumed that the quality of the liquid-state refrigerant-absorbent mixture in the container 60 is 0. Here, the liquid-state refrigerant-absorbent mixture in the regenerating device 20 is in a saturated state.

The temperature sensor 82 and the pressure sensor 84 measure the temperature and pressure of the liquid-state refrigerant-absorbent mixture in the container 60.

The arithmetic operation unit 74 of the controller 70 may obtain the concentration of the liquid-state refrigerant-absorbent mixture by substituting the temperature and pressure measured in real-time for the database stored in the memory unit 72.

In addition, the controller 70 may control the display unit 86 to display the concentration obtained in real-time.

Thus, the concentration of the liquid-state refrigerant-absorbent mixture may be obtained in online in real-time.

In addition, since the container 60 is directly connected to the regenerating device liquid-state ejection passage 22, the liquid-state refrigerant-absorbent mixture does not need to be additionally extracted from the absorption type heat pump 1 of FIG. 1, and an error may be prevented from being generated due to gasification that may occur during extraction.

Figure 3:
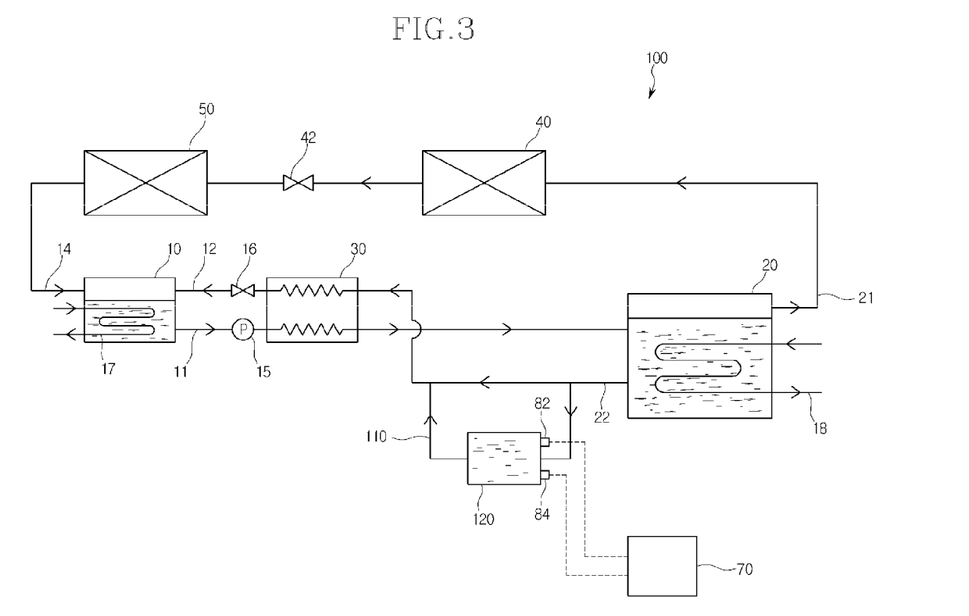
FIG. 3 is a view of a structure of an absorption type heat pump including an apparatus for measuring concentration of a liquid-state refrigerant of a nonazeotrope refrigerant mixture, according to another embodiment of the present invention.

FIG. 3 is a view of a structure of an absorption type heat pump 100 including an apparatus for measuring concentration of a liquid-state refrigerant of a nonazeotrope refrigerant mixture, according to another embodiment of the present invention. Like reference numerals that are the same as those of FIG. 1, denote like elements, and hereinafter, differences between FIGS. 1 and 3 will be described.

Although the container 60 of FIG. 1 is directly installed at the regenerating device liquid-state ejection passage 22, a container 120 of FIG. 3 is installed at a bypass pipe 110 in which a liquid-state refrigerant-absorbent mixture is diverged from one side of a regenerating device liquid-state ejection passage 22 and is merged into the regenerating device liquid-state ejection passage 22. The bypass pipe 110 is configured to be disposed below the regenerating device liquid-state ejection pass 22 or to be diverged from a lower portion of the regenerating device liquid-state ejection passage 22. Thus, since only the liquid-state refrigerant-absorbent mixture located in a lower position than in a vapor refrigerant-absorbent mixture may flow into the bypass pipe 110, only the liquid-state refrigerant-absorbent mixture may be fully filled in the container 120. Thus, since the quality is 0, the concentration of the liquid-state refrigerant-absorbent mixture may be more precisely measured.

In the apparatus for measuring the concentration of the liquid-state refrigerant of the nonazeotrope refrigerant mixture having the above structure, when the liquid-state refrigerant-absorbent mixture flows into the container 120 via the bypass pipe 110, the temperature sensor 82 and the pressure sensor 84 measure the temperature and pressure of the liquid-state refrigerant-absorbent mixture in the container 60 in real-time. The arithmetic operation unit 74 of the controller 70 may obtain the concentration of the liquid-state refrigerant-absorbent mixture by substituting the temperature and pressure measured in real-time for the database stored in the memory unit 72.

Figure 4:
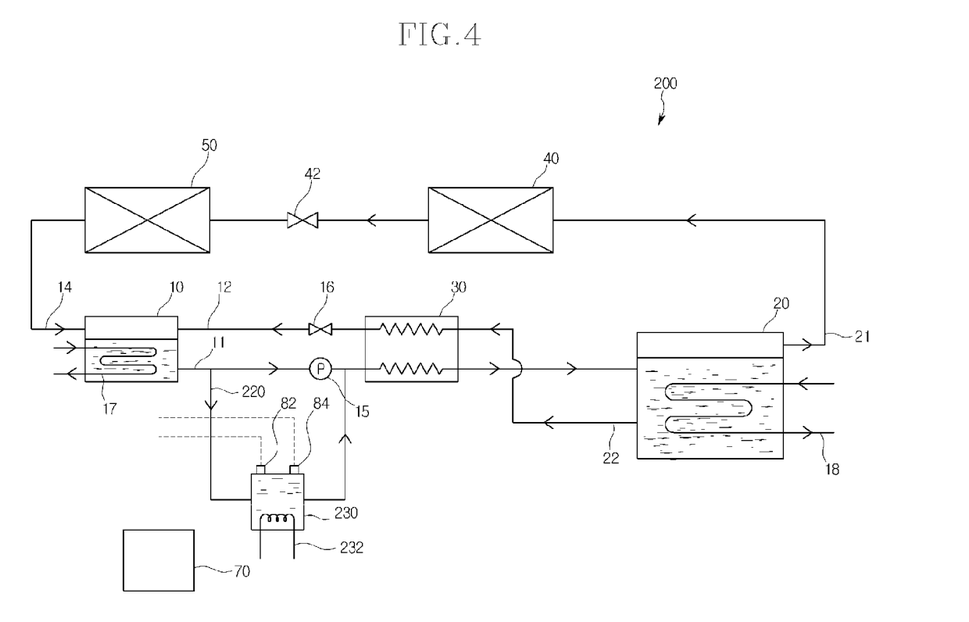
FIG. 4 is a view of a structure of an absorption type heat pump including an apparatus for measuring concentration of a liquid-state refrigerant of a nonazeotrope refrigerant mixture, according to another embodiment of the present invention.

FIG. 4 is a view of a structure of an absorption type heat pump 200 including an apparatus for measuring concentration of a liquid-state refrigerant of a nonazeotrope refrigerant mixture, according to another embodiment of the present invention. Like reference numerals that are the same as those of FIG. 1, denote like elements, and hereinafter, differences between FIGS. 1 and 4 will be described.

The container 60 of FIG. 1 is installed at an ejection side of the regenerating device 20. However, a container 230 of FIG. 4 is installed at an ejection side of an absorber 10. The container 230 is installed at a bypass pipe 220 in which a liquid-state refrigerant-absorbent mixture is diverged from one side of an absorber liquid-state ejection passage 11 and is merged into the absorber liquid-state ejection passage 11; however, the container 230 may be directly connected to the absorber liquid-state ejection passage 11.

In addition, a cooler 17 of the absorber 10 may cool the nonazeotrope refrigerant mixture to be in a subcooled state (not in a saturated state) in order to increase the absorption efficiency of the absorber 10.

A heater 232 is installed at the container 230 so as to heat the liquid-state refrigerant-absorbent mixture subcooled by the absorber 10 and so as to make the liquid-state refrigerant-absorbent mixture in a saturated state. A database stored in a memory unit 72 of a controller 70 is a database regarding the relationship between a saturation vapor pressure, temperature, quality, and concentration of the nonazeotrope refrigerant mixture in the saturated state. Thus, the heater 232 heats the subcooled liquid-state refrigerant-absorbent mixture flowing into the container 120 and makes the liquid-state refrigerant-absorbent mixture in the saturated state until the quality of the liquid-state refrigerant-absorbent mixture is 0. The controller 70 may control an operation of the heater 232 by operating the cooler 17. The temperature and pressure of the liquid-state refrigerant-absorbent mixture that is filled in the container 230 and that is in the saturated state formed by the heater 232, may be measured. Thus, the controller 70 may calculate the concentration of the liquid-state refrigerant-absorbent mixture.

The heater 232 is installed at the container 230. However, aspects of the present invention are not limited thereto, and the heater 232 may be installed on the absorber liquid-state ejection passage 11 or in any position in which the liquid-state refrigerant-absorbent mixture subcooled by the absorber 10 may be heated.

Figure 5:
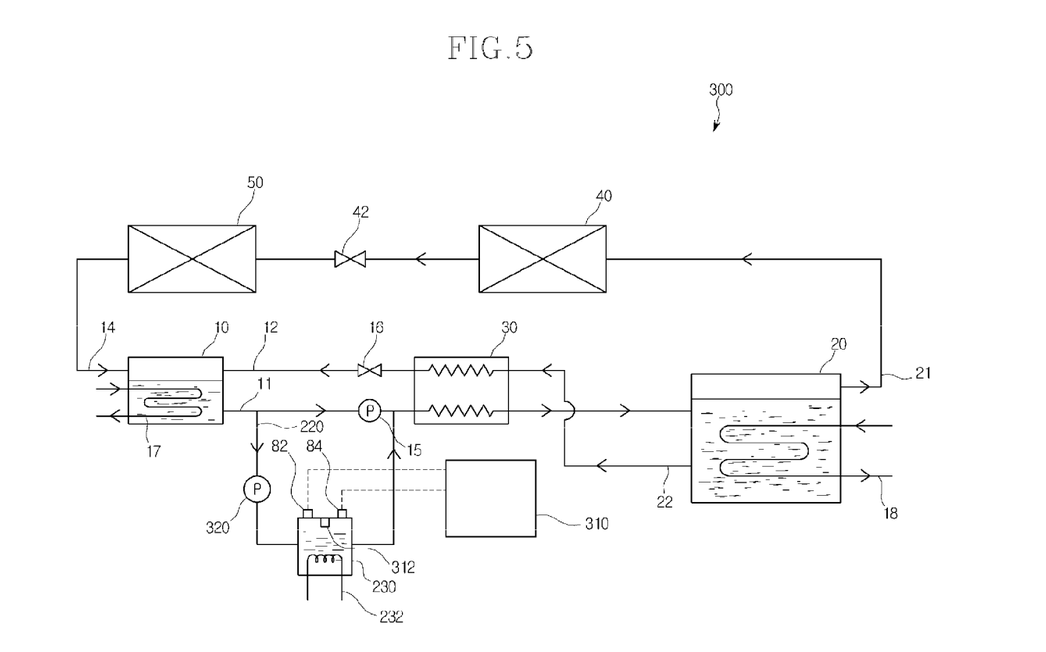
FIG. 5 is a view of a structure of an absorption type heat pump including an apparatus for measuring concentration of a liquid-state refrigerant of a nonazeotrope refrigerant mixture, according to another embodiment of the present invention.
Figure 6:
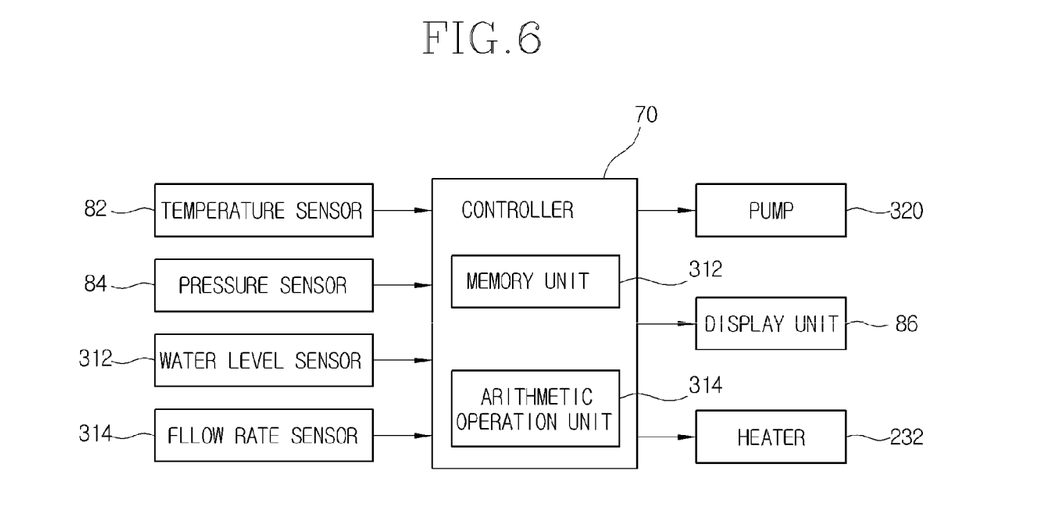
FIG. 6 is a block diagram of a control configuration of the absorption type heat pump illustrated in FIG. 5.

FIG. 5 is a view of a structure of an absorption type heat pump 300 including an apparatus for measuring concentration of a liquid-state refrigerant of a nonazeotrope refrigerant mixture, according to another embodiment of the present invention. FIG. 6 is a block diagram of a control configuration of the absorption type heat pump 300 illustrated in FIG. 5.

Like reference numerals that are the same as those of FIG. 4, denote like elements, and hereinafter, a difference between FIGS. 4 and 5 will be described. The difference therebetween is a level sensor 312 installed in a container 230 and a pump 320 installed at a bypass pipe 220.

The level sensor 312 senses the level of a liquid-state refrigerant-absorbent mixture filled in the container 230. The level sensor 312 may be a sensor that is disposed at an upper side inside the container 230 and determines whether the liquid-state refrigerant-absorbent mixture is located in a position having a predetermined height inside the container 230. A controller 310 may receive a value sensed by the level sensor 321, as well as values measured by a temperature sensor 82 and a pressure sensor 84, may compare the sensed level with a set level, and may determine quality of the liquid-state refrigerant-absorbent mixture. That is, when the level of the liquid-state refrigerant-absorbent mixture filled in the container 230 exceeds the set level, the controller 310 may determine that the liquid-state refrigerant-absorbent mixture is fully filled in the container 230, and it may be assumed that the quality of the liquid-state refrigerant-absorbent mixture is 0.

The pump 320 may increase or decrease a flow rate of the liquid-state refrigerant-absorbent mixture flowing into the bypass pipe 220. That is, when the level sensed by the level sensor 312 is less than the set level, the controller 310 may operate the pump 320 so as to increase or decrease the flow rate of the liquid-state refrigerant-absorbent mixture flowing into the bypass pipe 220.

In addition, the absorption type heat pump 300 of FIG. 4 may further include a flow rate sensor 314 that senses a flow rate of a nonazeotrope refrigerant mixture circulating the absorption type heat pump 300.

The controller 310 compares the flow rate of the nonazeotrope refrigerant mixture sensed by the flow rate sensor 314 with a set flow rate. Thus, when the flow rate of the nonazeotrope refrigerant mixture sensed by the flow rate sensor 314 exceeds the set flow rate, the controller 310 may reduce a degree of heating by using the heater 232 because an overcooling rate of a cooler 17 is decreased.

In the apparatus for measuring the concentration of the liquid-state refrigerant of the nonazeotrope refrigerant mixture having the above structure, when the subcooled liquid-state refrigerant-absorbent mixture flowing into the container 230 via the bypass pipe 220, the liquid-state refrigerant-absorbent mixture is heated by the heater 232 to be in a saturated state. The temperature sensor 82 and the pressure sensor 84 measure the temperature and pressure of the saturated liquid-state refrigerant-absorbent mixture in real-time, and the level sensor 312 senses the level of the liquid-state refrigerant-absorbent mixture. The controller 310 may determine whether to assume the quality is 0 based on the sensed water, and the arithmetic operation unit 314 may obtain the concentration of the liquid-state refrigerant-absorbent mixture by substituting the temperature and pressure measured in real-time for a database stored in a memory unit 312.

Figure 7:
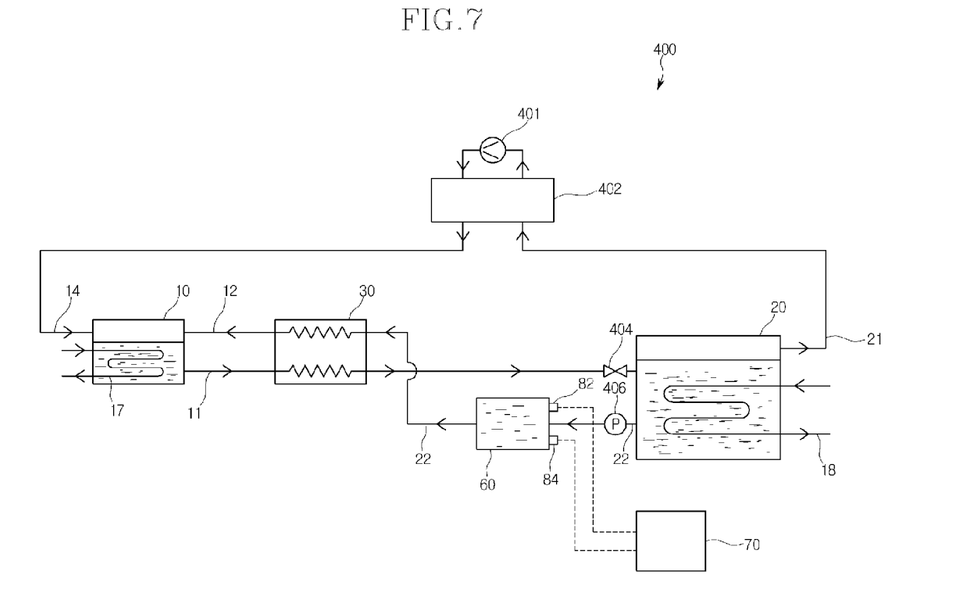
FIG. 7 is a view of a structure of a 1-stage compressing-absorbing type heat pump including an apparatus for measuring concentration of a liquid-state refrigerant of a nonazeotrope refrigerant mixture, according to another embodiment of the present invention.

FIG. 7 is a view of a structure of a 1-stage compressing-absorbing type heat pump 400 including an apparatus for measuring concentration of a liquid-state refrigerant of a nonazeotrope refrigerant mixture, according to another embodiment of the present invention. Like reference numerals that are the same as those of FIG. 1, denote like elements, and hereinafter, differences between FIGS. 1 and 7 will be described.

Referring to FIG. 7, the 1-state compressing-absorbing type heat pump 400 includes an absorber 10, a desorber 20, an intermediate heat exchanger 30, a compressor 401, and a dehumidifying rotor 402.

The compressor 401 compresses a vapor refrigerant-absorbent mixture that is evaporated by the desorber 20. The dehumidifying rotor 402 may be disposed so as to prevent the compressor 401 from being damaged by liquid compression when a liquid state is contained in a refrigerant-absorbent mixture flowing into the compressor 401.

The dehumidifying rotor 402 absorbs the liquid-state refrigerant-absorbent mixture. The dehumidifying rotor 402 is rotated, and the liquid state absorbed into the dehumidifying rotor 402 is regenerated by using a high-temperature and high-pressured refrigerant ejected from the compressor 401, and flows into the absorber 10 together with the high-temperature and high-pressure refrigerant.

The 1-stage compressing-absorbing type heat pump 400 having the above structure may also include a container 60 that is disposed at an ejection side of the absorber 10 or the desorber 20. A pump 406 for pumping the liquid-state refrigerant-absorbent mixture may be disposed on a liquid-state ejection passage 22 of the desorber 20. The pump 406 is disposed between the desorber 20 and the container 60. However, aspects of the present invention are not limited thereto, and the pump 406 may be disposed at the ejection side of the desorber 20, like between the container 60 and the intermediate heat exchanger 30. In addition, a throttle valve 404 may be disposed at an inlet side of the desorber 20.

By measuring the temperature and pressure of the liquid-state refrigerant-absorbent mixture in a saturated state flowing into the container 60 and is filled in the container 60, the concentration of the liquid-state refrigerant-absorbent mixture may be calculated in real-time from a database regarding the relationship between a saturation vapor pressure, temperature, quality, and concentration of the refrigerant-absorbent mixture stored in a memory unit 72 of the controller 70. However, aspects of the present invention are not limited thereto, and the container 60 may be disposed at an ejection side of the absorber 10.

Figure 8:
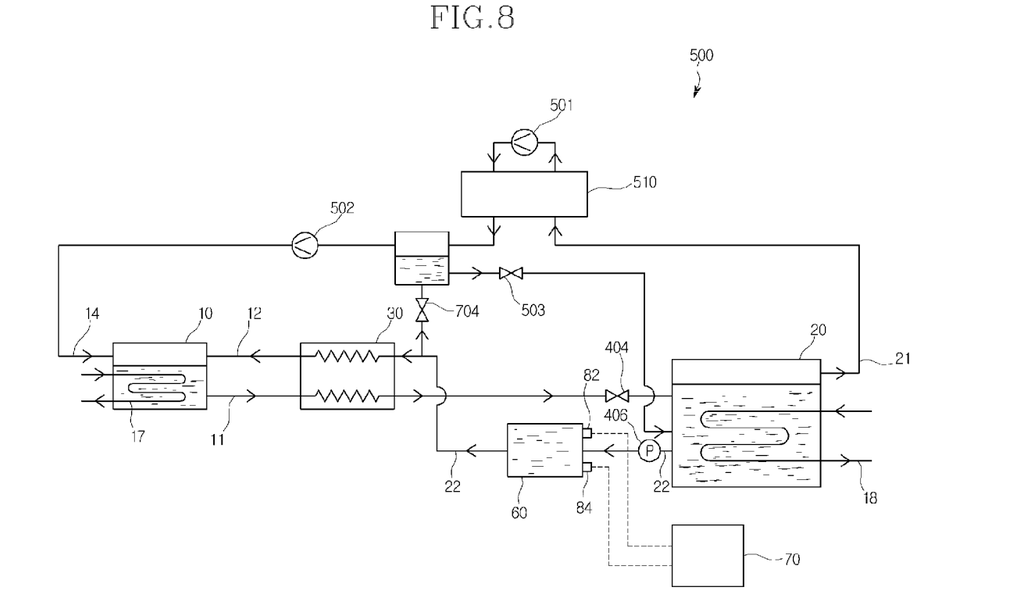
FIG. 8 is a view of a structure of a 2-stage compressing-absorbing type heat pump including an apparatus for measuring concentration of a liquid-state refrigerant of a nonazeotrope refrigerant mixture, according to another embodiment of the present invention.

FIG. 8 is a view of a structure of a 2-stage compressing-absorbing type heat pump 500 including an apparatus for measuring concentration of a liquid-state refrigerant of a nonazeotrope refrigerant mixture, according to another embodiment of the present invention. Like reference numerals that are the same as those of FIG. 7, denote like elements, and hereinafter, a difference between FIGS. 7 and 8 will be described.

The difference therebetween is that a compressor of the 2-stage compressing-absorbing type heat pump 500 includes a low-pressure compressor 501, an intermediate cooler 520, and a high-pressure compressor 502.

The low-pressure compressor 501 compresses a refrigerant that is evaporated by the desorber 20, and enables the compressed refrigerant to flow into the intermediate cooler 520. The pump 406 pressurizes a refrigerant-absorbent mixture in which a part of the refrigerant is evaporated by the desorber 20 and the refrigerant is in a dilute concentrated state, and supplies the refrigerant-absorbent mixture to the absorber 10. In this case, a part of a low-temperature refrigerant-absorbent mixture is diverged and flows into the intermediate cooler 520. An intermediate cooling controlling valve 504 controls a flow rate of the refrigerant-absorbent mixture flowing into the intermediate cooler 520.

The intermediate cooler 520 mixes an intermediate pressure refrigerant that is ejected from the low-pressure compressor 501, with the low-pressure refrigerant-absorbent mixture that is ejected from the pump 406, and the temperature of the liquid-state refrigerant-absorbent mixture is lowered. The liquid-state refrigerant-absorbent mixture of the intermediate cooler 520 is depressurized by a return valve 503 and is recovered by the desorber 20. A vapor refrigerant of the intermediate cooler 520 flows into the high-pressure compressor 502 and is compressed. A compressor work of the high-pressure compressor 502 is reduced due to the intermediate cooler 520.

The high-pressure compressor 502 compresses the refrigerant that passes through the low-pressure compressor 502 and a dehumidifying rotor 510. A high-temperature and high-pressure refrigerant that is compressed by the high-pressure compressor 502 flows into the absorber 10 and is absorbed into the refrigerant-absorbent mixture. An intermediate cooler may be disposed between the low-pressure compressor 501 and the high-pressure compressor 520 so as to reduce the compressor work of the high-pressure compressor 502.

The 2-stage compressing-absorbing type heat pump 500 having the above structure may also include a container 60 that is disposed at an ejection side of the absorber 10 or the desorber 20. By measuring the temperature and pressure of the liquid-state refrigerant-absorbent mixture in the saturated state that flows into the container 60 and is filled in the container 60, the concentration of the liquid-state refrigerant-absorbent mixture may be calculated in real-time from a database regarding the relationship between a saturation vapor pressure, temperature, quality, and concentration of the refrigerant-absorbent mixture stored in the memory unit 72 of the controller 70. However, aspects of the present invention are not limited thereto, and the container 60 may be disposed at the ejection side of the absorber 10.

In the absorption type heat pumps 1, 100, 200, and 300 illustrated in FIGS. 1, 3, 4, and 5, the container 60, 120, or 230 is installed only at an ejection side of one of the absorber 10 and the regenerating device 20. However, aspects of the present invention are not limited thereto, and the container 60, 120, or 230 may be installed at an ejection side of the absorber 10 and an ejection side of the regenerating device 20. In addition, in the 1-stage compressing-absorbing type heat pump 400 and the 2-stage compressing-absorbing type heat pump 500 illustrated in FIGS. 7 through 9, the container 60 is installed only at an ejection side of one of the absorber 10 or the desorber 20. However, aspects of the present invention are not limited thereto, and the container 60 may be installed at the ejection side of the absorber 10 and the ejection side of the desorber 20, respectively. When the container 60 is installed at both the ejection side of the absorber 10 and the ejection side of the regenerating device or the desorber 20, each container is configured in such a way that the temperature and pressure of the liquid-state refrigerant-absorbent mixture are separably measured, and the concentration of the liquid-state refrigerant-absorbent mixture may be calculated based on the measured temperature and pressure.

As described above, in an apparatus and method for measuring concentration of a liquid-state refrigerant-absorbent mixture of a nonazeotrope refrigerant mixture according to the one or more embodiments of the present invention, a container is configured in such a way that a liquid-state refrigerant-absorbent mixture of the nonazeotrope refrigerant mixture can be temporarily stored. By measuring the temperature and pressure of the liquid-state refrigerant-absorbent mixture, the concentration of the liquid-state refrigerant-absorbent mixture can be calculated from a database regarding the relationship between a saturation vapor pressure, temperature, quality, and concentration of the previously-stored nonazeotrope refrigerant mixture. Thus, a configuration for measuring the concentration of the liquid-state refrigerant-absorbent mixture includes a container, a temperature sensor and a pressure sensor and thus is very simple and the cost for the configuration can be reduced. In addition, since the container is installed on a flow passage on which the liquid-state refrigerant mixture in the saturated state flows, so as to measure the temperature and pressure of the liquid-state refrigerant-absorbent mixture, evaporation or leakage does not occur during an extraction process and thus, a concentration measurement error can be minimized. In addition, the container can be easily mounted on existing equipment without disturbance of a flow.

In addition, since the liquid-state refrigerant mixture flows into the container, is filled in the container and is re-ejected from the container, the concentration of the liquid-state refrigerant mixture flowing into the container may be measured in real-time and may be displayed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for measuring concentration of a liquid-state refrigerant of a nonazeotrope refrigerant mixture, the apparatus comprising:

an absorber having a vapor refrigerant evaporated by an evaporator, wherein the vapor refrigerant is absorbed in a refrigerant-absorbent mixture;

a regenerating device having a heating source capable of evaporating a part of a refrigerant from the refrigerant-absorbent mixture ejected from the absorber;

a condenser condensing the evaporated refrigerant ejected from the regenerating device and transfers the condensed refrigerant to the evaporator, wherein the evaporated refrigerant flows into the condenser via a regenerating device vapor ejection passage;

a container having a liquid-state refrigerant mixture of the nonazeotrope refrigerant mixture which flows from the regenerating device into one side of the container via a regenerating device liquid-state ejection passage and is filled in an internal storage space of the container, wherein the filled liquid-state refrigerant mixture is discharged from the other side of the container to an intermediate heat exchanger via the regenerating device liquid-state ejection passage, the intermediate heat exchanger being disposed between the absorber and the regenerating device and heat-exchanging the refrigerant-absorbent mixture ejected from the absorber with the filled liquid-state refrigerant mixture ejected from the regenerating device, wherein the regenerating device and the container are directly connected to the liquid-state ejection passage, wherein the container is disposed between the intermediated heat exchanger and the regenerating device;

a temperature sensor that measures a temperature of the liquid-state refrigerant mixture;

a pressure sensor that measures a pressure of the liquid-state refrigerant mixture in a saturated state or a pressure of the container; and a controller comprising a memory unit in which a database regarding a relationship between a saturation vapor pressure, temperature, quality, and concentration of the nonazeotrope refrigerant mixture in the saturated state is stored, and an arithmetic operation unit that calculates concentration of the liquid-state refrigerant mixture from the database based on the temperature and the pressure measured by the temperature sensor and the pressure sensor, assuming that quality of the liquid-state refrigerant mixture is set quality.

2. The apparatus of claim 1, wherein the set quality is 0.

3. The apparatus of claim 1, wherein each of the temperature sensor and the pressure sensor measures temperature and pressure of the liquid-state refrigerant mixture in real-time, and the arithmetic operation unit calculates concentration of the liquid-state refrigerant mixture in real-time based on the temperature and the pressured measured in real-time.

4. The apparatus of claim 1, wherein the temperature sensor and the pressure sensor are installed at the container.

5. The apparatus of claim 1, further comprising a level sensor that is installed inside the container and senses a level of the liquid-state refrigerant mixture filled in the container, wherein the controller determines quality of the liquid-state refrigerant mixture based on the level sensed by the level sensor.

6. The apparatus of claim 1, further comprising a bypass pipe that is diverged from the regenerating device liquid-state ejection passage from which the liquid-state refrigerant mixture is ejected and that is merged into the regenerating device liquid-state ejection passage, wherein the liquid-state refrigerant mixture flows into the one side of the container via the bypass pipe, wherein the filled liquid-state refrigerant mixture discharges from the other side of the container via the bypass pipe, wherein the container is installed at the bypass pipe.

7. The apparatus of claim 6, wherein a pump is installed at the bypass pipe, and the controller controls an operation of the pump so that a level of the liquid-state refrigerant mixture filled in the container reaches a set level.

8. The apparatus of claim 6, wherein the bypass pipe is diverged from a lower portion of the regenerating device liquid-state ejection passage so that only the liquid-state refrigerant mixture is bypassed.

9. An apparatus for measuring concentration of a liquid-state refrigerant of a nonazeotrope refrigerant mixture, the apparatus comprising:

an absorber having a vapor refrigerant evaporated by an evaporator, wherein the vapor refrigerant is absorbed in a refrigerant-absorbent mixture;

a regenerating device having a heating source capable of evaporating a part of a refrigerant from the refrigerant-absorbent mixture ejected from the absorber;

a condenser condensing the evaporated refrigerant ejected from the regenerating device and transfers the condensed refrigerant to the evaporator, wherein the evaporated refrigerant flows into the condenser via a regenerating device vapor ejection passage;

a container having a liquid-state refrigerant mixture of the nonazeotrope refrigerant mixture which flows from the regenerating device into one side of the container via a regenerating device liquid-state ejection passage and is filled in an internal storage space of the container, wherein the filled liquid-state refrigerant mixture is discharged from the other side of the container to an intermediate heat exchanger via the regenerating device liquid-state ejection passage, the intermediate heat exchanger being disposed between the absorber and the regenerating device and heat-exchanging the refrigerant-absorbent mixture ejected from the absorber with the filled liquid-state refrigerant mixture ejected from the regenerating device, wherein the regenerating device and the container are directly connected to the liquid-state ejection passage, wherein the container is disposed between the intermediated heat exchanger and the regenerating device;

a heater heating a subcooled liquid-state refrigerant mixture as in a saturated state;

a temperature sensor that measures a temperature of the heated liquid-state refrigerant mixture;

a pressure sensor that measures a pressure of the liquid-state refrigerant mixture in the subcooled state or a pressure of the container; and a controller comprising a memory unit in which a database regarding a relationship between a saturation vapor pressure, temperature, quality, and concentration of the liquid-state refrigerant mixture in the saturated state is stored, and an arithmetic operation unit that calculates concentration of the liquid-state refrigerant mixture from the database based on the temperature and the pressure measured by the temperature sensor and the pressure sensor, assuming that quality of the liquid-state refrigerant mixture is set quality.

10. The apparatus of claim 9, wherein the set quality is 0.

11. The apparatus of claim 9, wherein the heater heats the liquid-state refrigerant mixture so that quality of the liquid-state refrigerant mixture is 0.

12. The apparatus of claim 9, wherein each of the temperature sensor and the pressure sensor measures temperature and pressure of the liquid-state refrigerant mixture in real-time, and the arithmetic operation unit calculates concentration of the liquid-state refrigerant mixture in real-time based on the temperature and the pressured measured in real-time.

13. The apparatus of claim 9, wherein the temperature sensor and the pressure sensor are installed at the container.

14. The apparatus of claim 9, further comprising a level sensor that is installed inside the container and senses a level of the liquid-state refrigerant mixture filled in the container,
wherein the controller determines quality of the liquid-state refrigerant mixture based on the level sensed by the level sensor.

15. The apparatus of claim 9, further comprising a bypass pipe that is diverged from the regenerating device liquid-state ejection passage from which the liquid-state refrigerant mixture is ejected and that is merged into the regenerating device liquid-state ejection passage,
wherein the liquid-state refrigerant mixture flows into the one side of the container via the bypass pipe,
wherein the filled liquid-state refrigerant mixture discharges from the other side of the container via the bypass pipe,
wherein the container is installed at the bypass pipe.

16. The apparatus of claim 15, wherein a pump is installed at the bypass pipe, and the controller controls an operation of the pump so that a level of the liquid-state refrigerant mixture filled in the container reaches a set level.

17. The apparatus of claim 15, wherein the bypass pipe is diverged from a lower portion of the regenerating device liquid-state ejection passage so that only the liquid-state refrigerant mixture is bypassed.

18. An absorption type heat pump comprising an apparatus for measuring concentration of a liquid-state refrigerant of a nonazeotrope refrigerant mixture, wherein the apparatus for measuring concentration of the liquid-state refrigerant of a nonazeotrope refrigerant mixture comprises:
an absorber into which a vapor refrigerant evaporated by an evaporator flows and which enables the vapor refrigerant to be absorbed in a refrigerant-absorbent mixture;
a regenerating device having a heating source capable of evaporating a part of a refrigerant from the refrigerant-absorbent mixture ejected from the absorber;
a condenser that condenses the evaporated refrigerant ejected from the regenerating device and transfers the condensed refrigerant to the evaporator, wherein the evaporated refrigerant flows into the condenser via a regenerating device vapor ejection passage;
a container having a liquid-state refrigerant mixture of the nonazeotrope refrigerant mixture which flows from the regenerating device into one side of the container via a regenerating device liquid-state ejection passage and is filled in an internal storage space of the container,
wherein the filled liquid-state refrigerant mixture is discharged from the other side of the container to an intermediate heat exchanger via the regenerating device liquid-state ejection passage, the intermediate heat exchanger being disposed between the absorber and the regenerating device and heat-exchanging the refrigerant-absorbent mixture ejected from the absorber with the filled liquid-state refrigerant mixture ejected from the regenerating device,
wherein the regenerating device and the container are directly connected to the liquid-state ejection passage;
a temperature sensor that is disposed on the container and measures a temperature of the liquid-state refrigerant-absorbent mixture;
a pressure sensor that is disposed on one among the absorber, the regenerating device, and the container and measures a pressure of the liquid-state refrigerant mixture in a saturated state or a pressure of the container; and
a controller comprising a memory unit in which a database regarding a relationship between a saturation vapor pressure, temperature, quality, and concentration of the liquid-state refrigerant mixture in the saturated state is stored, and an arithmetic operation unit that calculates concentration of the liquid-state refrigerant mixture from the database based on the temperature and the pressure measured by the temperature sensor and the pressure sensor, assuming that quality of the liquid-state refrigerant mixture is set quality.

19. The absorption type heat pump of claim 18, further comprising a heater that is disposed on the container and heats the ejected and subcooled liquid-state refrigerant-absorbent mixture as in a saturated state.

* * * * *